United States Patent
Park et al.

(10) Patent No.: US 7,366,114 B2
(45) Date of Patent: Apr. 29, 2008

(54) METHOD FOR PROVIDING QOS (QUALITY OF SERVICE)—GUARANTEEING MULTI-PATH AND METHOD FOR PROVIDING DISJOINT PATH USING THE SAME

(75) Inventors: Hye Kyeong Park, Daejeon (KR); Tae Il Kim, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 943 days.

(21) Appl. No.: 10/622,877

(22) Filed: Jul. 18, 2003

(65) Prior Publication Data

US 2004/0042473 A1 Mar. 4, 2004

(30) Foreign Application Priority Data

Aug. 28, 2002 (KR) ............... 10-2002-0051097

(51) Int. Cl.
 *H04L 12/28* (2006.01)
(52) U.S. Cl. ............... 370/256; 370/351; 370/408
(58) Field of Classification Search ......... 370/254–256
 See application file for complete search history.

(56) References Cited

U.S. PATENT DOCUMENTS

| | | | |
|---|---|---|---|
| 6,347,078 B1 | 2/2002 | Narvaez-Guarnieri et al. | |
| 6,717,921 B1 * | 4/2004 | Aggarwal et al. | .......... 370/256 |
| 6,829,216 B1 * | 12/2004 | Nakata | .............. 370/228 |
| 6,879,564 B2 * | 4/2005 | Parham et al. | .............. 370/256 |
| 7,280,481 B2 * | 10/2007 | Rong | .................. 370/238 |
| 2003/0193898 A1 * | 10/2003 | Wong et al. | ............. 370/252 |

FOREIGN PATENT DOCUMENTS

KR 1020010003353 1/2001

OTHER PUBLICATIONS

Hae-Kyeong Park, et al., "A Fast Randomized QoS Routing Algorithm", Coin.WeB4 (Coin 2002. Jul. 21-25, 2002, Cheju, Korea), pp. 224-226.
Wang Jianxin et al., "A Randomized QoS Routing Algorithm On Networks with Inaccurate Link-State Information", 0-7803-6394-9/00, copyright IEEE, pp. 1617-1622.

* cited by examiner

*Primary Examiner*—Chau Nguyen
*Assistant Examiner*—Marcus R Smith
(74) *Attorney, Agent, or Firm*—Blakely, Sokoloff, Taylor & Zafman LLP (57) ABSTRACT

A method for providing a QoS-guaranteeing multi-path and a method for providing disjoint paths using the same are provided. The method configures the shortest path tree by adapting the start node "s" and the destination node "d". When a new node is selected as a tree node in a tree configuration process according to the "s" or the "d", the closest node to either the "s" or the "d" is selected. If a specified node "v" is contained in both a tree oriented from the "s" and another tree oriented from the "d", one path of "s"-"v"-"d" is created. If all nodes are contained in either the tree of "s" or the other tree of "d", then a program of path creation process is terminated. Further, the method further includes a step for determining two disjoint paths from the "s" to the "d" among the found multiple paths above.

10 Claims, 8 Drawing Sheets

METHOD FOR PROVIDING QOS (QUALITY OF SERVICE)—GUARANTEEING MULTI-PATH AND METHOD FOR PROVIDING DISJOINT PATH USING THE SAME

BACKGROUND OF THE INVENTION

1. Field of the Invention

The present invention relates to a method for providing a QoS-guaranteeing multi-path, and more particularly to a method for providing a QoS-guaranteeing multi-path to find multiple paths satisfying two QoS parameters (i.e., a required bandwidth and a required delay time) from a start node to a destination node in a path-based communication network, and a method for providing a disjoint path using the same method.

2. Description of the Prior Art

Presently, an Internet network provides users with only a best-effort service. However, following the current trend of not only rapidly increasing an amount of traffic due to increased Internet users, but also developing a variety of applications, techniques for guaranteeing an appropriate QoS in a network are increasingly developed. In recent times, many developers are intensively conducting research into a new technique for extending a link state protocol, for example, an OSPF (Open Shortest Path First), and an ISIS (Intermediate System to Intermediate System), etc., to transmit various QoS metrics in an IETF.

A distance vector algorithm has been widely adapted as a general path search method for performing a routing function guaranteeing a QoS required for transmitting multimedia information over a variety of communication networks. The distance vector algorithm has been adapted as a representative RIP (Routing Information Protocol) Internet routing protocol. The distance vector algorithm can be easily implemented due to its own simple configuration. However, the distance vector algorithm consumes much time and bandwidth to collect all path information at individual nodes, and is unable to select an optimal QoS path at each node.

A path search operation in a QoS routing service is different from that in a best-effort service. In more detail, the QoS routing service adapts at least one metric of individual links, and finds a path from a start node to a destination node on the basis of the start node, differently from the best-effort service. A problem caused when finding an optimum path for fully optimizing at least two metrics in a network having the two metrics is well known as an NP-complete problem. Recently, there have been proposed a variety of effective algorithms for solving the NP-complete problem. Particularly, an inventor "Xin Yuan" proposed a path search algorithm satisfying two QoS parameters using a Bellman-Ford algorithm during a predetermined time $0(n^3)$, and an inventor "Gang" proposed a path search algorithm for finding an almost optimum path using a Dijkstra algorithm during a predetermined time $0(n^3)$. An inventor "Wang" proposed a path search algorithm for finding a plurality of paths using the Gang's algorithm, and selecting one path from among the found paths, resulting in reduction of a failure rate in a path setup process. An inventor "Yanxia" proposed a variety of QoS-path algorithms for finding K paths during a specific time $0(km)$. However, because the aforementioned conventional algorithms periodically provide users with link state information, the aforementioned conventional algorithms consume a great deal of bandwidth. Further, if there is no consideration for multimedia services or a variety of multimedia services are requested at different nodes, the aforementioned conventional algorithms cannot satisfy various QoSs for every multimedia service.

In the meantime, a conventional art for finding a path guaranteeing a QoS is described in Korean Patent Application No. 1999-23623, which is incorporated herein by reference. This conventional art includes a method for finding the shortest path close to one destination so as to find multiple QoS paths during an optimum time using the shortest distance algorithm of Point-to-Multipoint access, a method for finding a path during a short time by distributing paths, and a method for setting up all paths satisfying a reference QoS associated with one destination, etc. However, these methods may be adapted for QoS routing functioning as a hop-by-hop routing model, and have a relatively long execution time, respectively.

An example of a Constraint-Base Routing Algorithm for finding a path that satisfies given constraints and at the same time optimizes a scalar metric of a conventional routing has been proposed by Young-Hwan JIN, et al., who have published a research paper entitled "IMPROVENEMENT OF CSPF ROUTING ALGORITHM FOR TRAFFIC ENGINEERING IN MPLS NETWORK" in the Korean Institutes of Communication Sciences Proceeding pp. 262 on 2001, which is incorporated herein by reference. The constraint-base routing algorithm is an optimum time algorithm for finding a path that satisfies a bandwidth and has the shortest delay time, repeatedly uses a conventional algorithm as it is, and selects one path, resulting in a hop-by-hop routing.

An example of a method for finding paths satisfying a variety of parameters, for example, a bandwidth value, a delay value, and a safety value, in the range from one start point to a destination has been proposed by Wang Jianxin, Wanf Weiping, Chen Jianer, and Chen Songqiao, who have published a research paper entitled "A RANDOMIZE QOS ROUTING ALGORITHM ON NETWORKS WITH INACCURATE LINK-STATE INFORMATION" in Communication Technology Proceedings 2000, WCC-ICCT 2000, and International Conference, vol. 2, pp. 1617~1622, on 2000, which is incorporated herein by reference. However, each of the aforementioned conventional methods has a complicated path calculation process and does not guarantee an optimum calculation time, such that it is not considered to be an optimum time algorithm.

SUMMARY OF THE INVENTION

The present invention provides a method for providing a QoS-guaranteeing multi-path, which removes a link not satisfying a first metric (e.g., a bandwidth value) from a common wired/wireless communication network, and then finds multiple paths satisfying a second metric (e.g., a delay value or a cost) during a specified time "0(m+nlogn)", and a computer-readable recording medium for storing a program executing the method for providing the QoS-guaranteeing multi-path.

In addition, the present invention provides a method for providing at least two disjoint paths used for guaranteeing service reliability using the found multiple paths.

In accordance with one aspect of the present invention, the above and other objects can be accomplished by the provision of a method for performing a process associated with a QoS-guaranteeing multi-path in a path-based communication network having a plurality of nodes, comprising the steps of: a1) determining a start node, a destination node and a requirement condition associated with a reference cost consumed in a range from the start node to the destination node; b1) creating a first tree adapting the start node as its root and a second tree adapting the destination node as its root, including nodes close to the start node in a first node group, and including nodes close to the destination node in a second node group; c1) selecting a node having a minimum cost associated with the roots from among a plurality of nodes contained in the first and second node groups, and including the selected node having the minimum cost in a tree of a corresponding root; d1) if the selected node included in the tree at the step (c1) is also included in the first and second trees, and a cost consumed in the range from the start node to the destination node on the basis of the selected node is less than the reference cost, providing a corresponding path associated with the cost; e1) including a nearby node of the selected node in a node group having the selected node when the selected node included in the tree at the step (c1) is also included in either one of the first and second trees, comparing two paths ranging from a root (i.e., a root of a nearby node's tree) to the nearby node when the nearby node is previously included in the node group, and deleting a link of a cheaper one of the two paths; and f1) determining whether there is a node contained in the first node group and the second node group, repeatedly performing a process from the step (c1) when the node is found in the first and second node groups, or terminating the process from the step (c1) when no node is found in the first and second node groups.

In accordance with another aspect of the present invention, there is provided a method for performing a process associated with a QoS-guaranteeing multi-path in a path-based communication network having a plurality of nodes, comprising the steps of: a2) determining a start node, a destination node and a requirement condition associated with a reference cost consumed in a range from the start node to the destination node; b2) creating a tree adapting an intermediate node as a root, and including nearby nodes close to the tree in a node group; c2) selecting one node having the lowest cost associated with the root from among nodes contained in the node group, and including the selected node in the tree of the root; d2) including a nearby node of the selected node included in the tree at the step (c2) in the node group, comparing two paths ranging from a root (i.e., a root of a nearby node's tree) to the nearby node when the nearby node is previously included in the node group, and deleting a link of a cheaper one of the two paths; and e2) determining whether there is a node contained in the node group, repeatedly performing a process from the step (c2) when the node is found in the node group, and outputting a path from the intermediate node to the start node and the other path from the intermediate node to the destination node.

Preferably, the present invention may further comprise the steps of: f2) determining a maximum number of paths satisfying the determined requirement condition; and g2) if a number of output paths is higher than the maximum number of paths, terminating a path setup program.

Preferably, the method may further include the steps of: selecting a first path from the start node to the destination node among a plurality of paths outputted at the step (d1) and the step (e2); and selecting at least one second path disjointed from an intermediate node existing in the first path from among multiple paths ranging from the start node to the destination node, and providing a disjoint path.

Preferably, the method may further include the steps of: selecting two paths from among a plurality of paths outputted at the step (d1) and the step (e2); and determining whether the selected two paths are disjointed from each other, and providing a disjoint path according the determination result.

In accordance with yet another aspect of the present invention, there is provided a computer-readable recording medium for storing a program in a processor, the program comprising the steps of: a3) determining a start node, a destination node and a requirement condition associated with a reference cost consumed in a range from the start node to the destination node; b3) creating a first tree adapting the start node as its root and a second tree adapting the destination node as its root, including nodes close to the start node in a first node group, and including nodes close to the destination node in a second node group; c3) selecting a node having a minimum cost associated with the roots from among a plurality of nodes contained in the first and second node groups, and including the selected node having the minimum cost in a tree of a corresponding root; d3) if the selected node included in the tree at the step (c3) is also included in the first and second trees, and a cost consumed in the range from the start node to the destination node on the basis of the selected node is less than the reference cost, outputting a corresponding path associated with the cost; e3) including a nearby node of the selected node in a node group having the selected node when the selected node included in the tree at the step (c3) is also included in either one of the first and second trees, comparing two paths ranging from a root (i.e., a root of a nearby node's tree) to the nearby node when the nearby node is previously included in the node group, and deleting a link of a cheaper one of the two paths; and f3) determining whether there is a node contained in the first node group and the second node group, repeatedly performing a process from the step (c3) when the node is found in the first and second node groups, or terminating the process from the step (c3) when no node is found in the first and second node groups.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The present invention is adapted to find multiple paths satisfying two QoS requirements in a path-based communication network during a given time "0(m+nlogn)". A first QoS metric such as a bandwidth is a specified metric higher than a predetermined threshold value, and a second QoS metric such as a delay time or a cost is a specified metric created by the sum of individual link values. The present invention removes a link not satisfying a first metric (e.g., a bandwidth value) from a graph associated with an input communication network, and then finds multiple paths satisfying a second metric (e.g., a delay value or a cost). If N nodes and M links are provided, the present invention finds multiple paths satisfying a QoS requirement during a specified time 0(m+nlogn) equal to a time for finding the shortest single path. Further, provided that the reference character "p" is the number of found paths, the present invention can find two disjoint paths from among all found paths during a given time "0(P)".

If a start node "s" and a destination node "d" are assigned a graph-shaped network receiving a weight as an input, the present invention provides a method for finding QoS-guarantee multiple paths in the range from the start node "s" to the destination node "d", and a method for finding more than two disjoint paths (i.e., a pair of disjoint paths) for the path protection or path restoration.

The present invention removes a link not satisfying a first metric (e.g., a bandwidth value) from a graph associated with an input communication network. For example, if a bandwidth is adapted as a metric and bandwidth values associated with all the links are less than a required bandwidth value, these links are removed from those shown in the graph. In this case, all edges are searched only once, resulting in an easy and simple search operation and the program execution time of "0(m)". Then, the present invention finds multiple paths satisfying a second metric (e.g., a delay or a cost). For example, the present invention finds paths satisfying a specified value requested by the sum of delay times. The present invention receives a graph from which a link not satisfying a first metric is removed, and then finds multiple paths satisfying a second metric, i.e., a requirement requested by the sum of delay times, during a given time "0(m+nlogn)". Subsequently, disjoint paths selected from among the found P paths is found within a given time "0(p)".

In more detail, the present invention is based on the shortest path algorithm proposed by Dijkstra, and finds available paths in the range of time complexity equal to that of Dijkstra's algorithm. The sum of weights of paths from a start node "s" to a destination node "d", i.e., a distance value, is contained in the found paths. These found paths indispensably include the shortest path from the start node "s" to the destination node "d".

A method for finding multiple paths according to the present invention configures the shortest path tree by adapting the start node "s" and the destination node "d" as a starting point. When a new node is selected as a tree node in a tree configuration process on the basis of the start node "s" or the destination node "d", the present invention selects the closest node to either the start node "s" or the destination node "d". If a specified node "v" is contained in both a tree oriented from the start node "s" and another tree oriented from the destination node "d", one path ranging from the start node "s" to the destination node "d" on the basis of the node "v" is created. If all nodes are contained in either the tree of node "s" or the other tree of node "d" by repeating the path creation process, then the present invention terminates a program for performing the path creation process.

All the nodes can be contained in the following sets. Tree nodes of trees based on the node "s" are set to a set T(s), tree nodes of tress based on the node "d" are set to a set T(d), a set of nodes close to the set T(s) is set to a set F(s), a set of nodes close to the set T(d) is set to a set F(d), and a set of nodes other than the above nodes of the sets T(s), T(d), F(s), and F(d) is set to a set "U". Predetermined parameters T(s)={s} and T(d)={d} are determined when a path search process starts. After a path search process has been completed, all nodes can be contained in either one of sets T(s) and T(d) or both sets T(s) and T(d). For this purpose, it should be noted that nodes contained in the ends T(s) and T(d) are a leaf node oriented from the node "s" and a leaf node oriented from the node "d", or the nodes "s" and "d" can be adapted as the nodes contained in the ends T(s) and T(d).

Further, a method for providing disjoint paths used for guaranteeing path protection or path restoration selects on path from among the found multiple paths, and adapts the selected path as a working path. A nearby node of the start node of the selected path and a nearby node of the destination node of the selected path select arbitrary other paths, and adapt the selected paths as their backup paths. If the nearby nodes do not find such backup paths, they must select arbitrary working paths and repeatedly perform the backup path search process.

Figure 1:
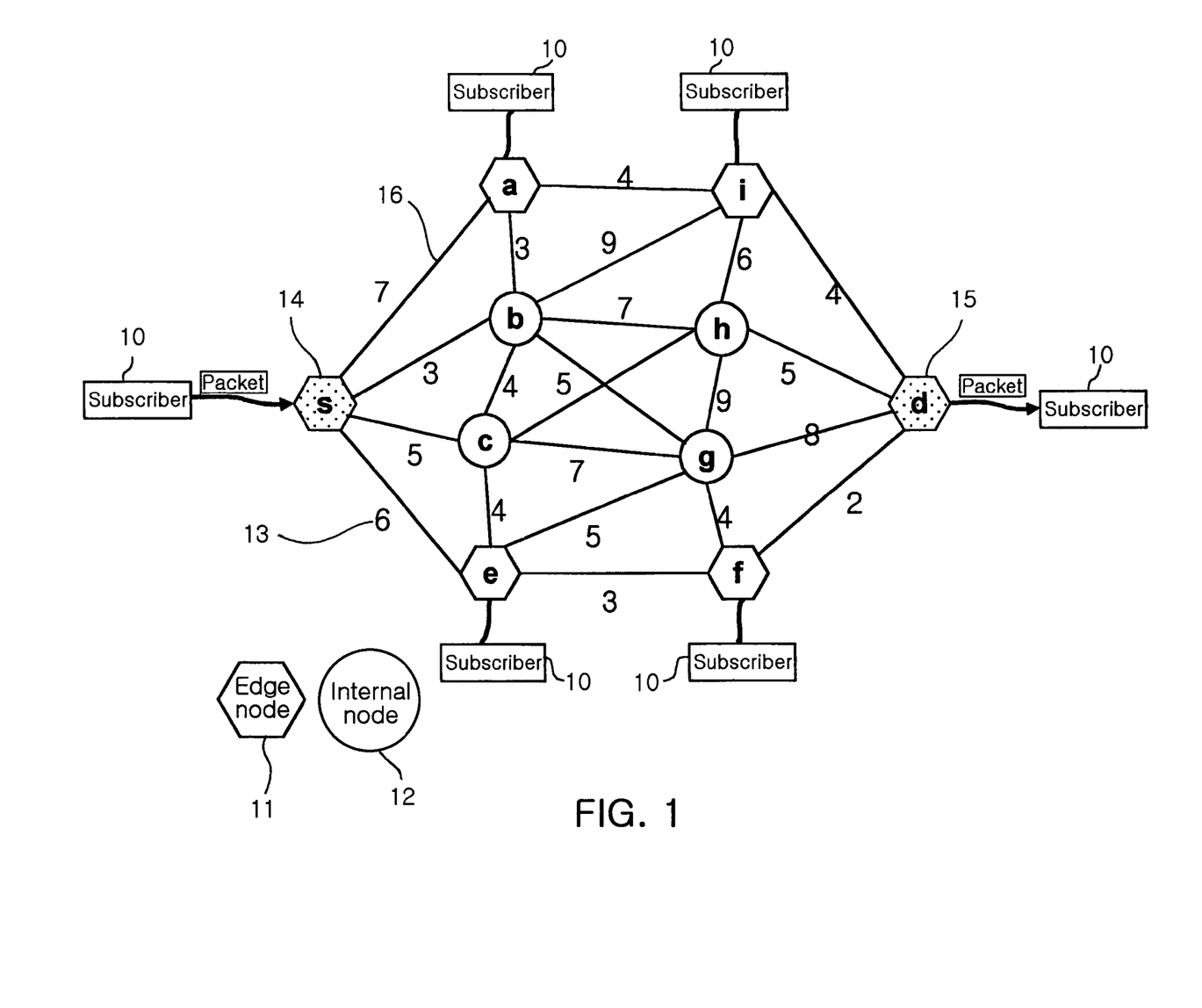
FIG. 1 is an exemplary view illustrating a QoS-routing graph model in accordance with a preferred embodiment of the present invention.

FIG. 1 is an exemplary view illustrating a QoS-routing graph model in accordance with a preferred embodiment of the present invention. A QoS service network is configured in the form of a complicated graph as shown in FIG. 1. The service network includes a plurality of edge nodes 11 directly connected with a subscriber 10 requesting a service, and a plurality of internal nodes 12 connected with the edge nodes 11 whereas it is not directly connected with the subscriber 10. Links 16 are arranged between the edge nodes 11 and the internal nodes 12, such that the edge nodes 11 are connected with the internal nodes 12. Individual links 16 have their associated cost 13, respectively. The cost 13 is a prescribed cost consumed for transmitting data over a corresponding link 16, for example, a delay time (or a delay value) of the link 16. If a subscriber sends a service request over a network, the QoS-service network must provide a transmission path ranging from a prescribed one edge node (e.g., a start node s14) to the other one edge node (e.g., a destination node d15).

Figure 2:
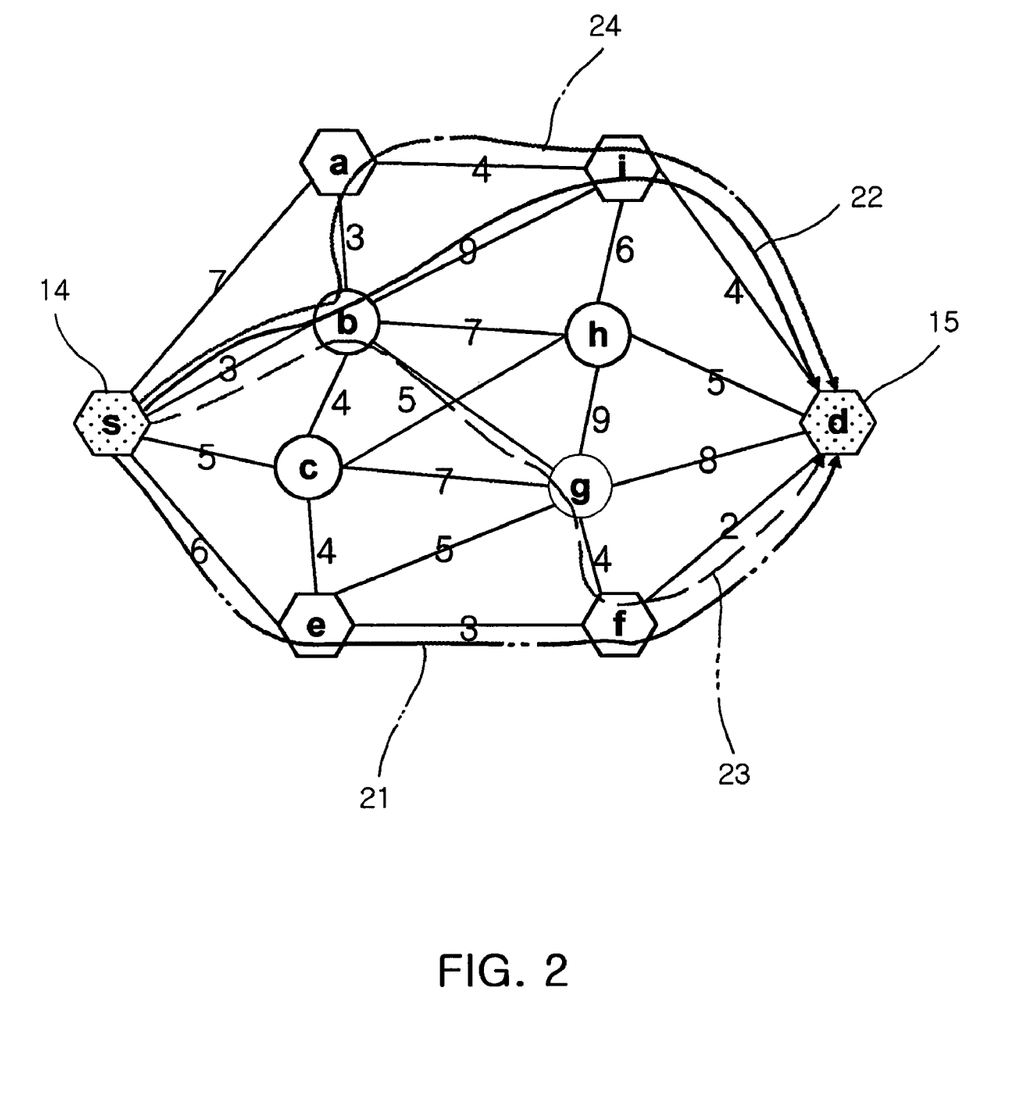
FIG. 2 is an exemplary view illustrating multi-QoS paths in accordance with a preferred embodiment of the present invention.

FIG. 2 is an exemplary view illustrating multi-QoS paths in accordance with a preferred embodiment of the present invention. Referring to FIG. 2, provided that a path consumes a cost of less than 14 in the range from the start node s14 to the destination node d15, four paths 21, 22, 23, 24 can be adapted as such a path satisfying the cost of less than 14. A first path 21 is the path "s→e→f→d", and the cost of the first path 21 is 11. The cost 11 of the first path 21 is considered to be a minimum cost. A second path 22 is the path "s→b→i→d", and the cost of the second path 22 is 13. A third path 23 is the path "s→b→g→f→d", and the cost of the third path 23 is 14. Of course, if a network service is performed over the first path 21 having the lowest cost, the best effort service can be accomplished. However, this method for adapting the first path 21 to accomplish the best effort service may not be a good solution to provide an overall network with a variety of services. If either one of four paths satisfying a requirement associated with a cost is selected, loads are appropriately distributed to a network, resulting in the prevention of network performance deterioration and an increased service efficiency across the overall network.

Figure 3:
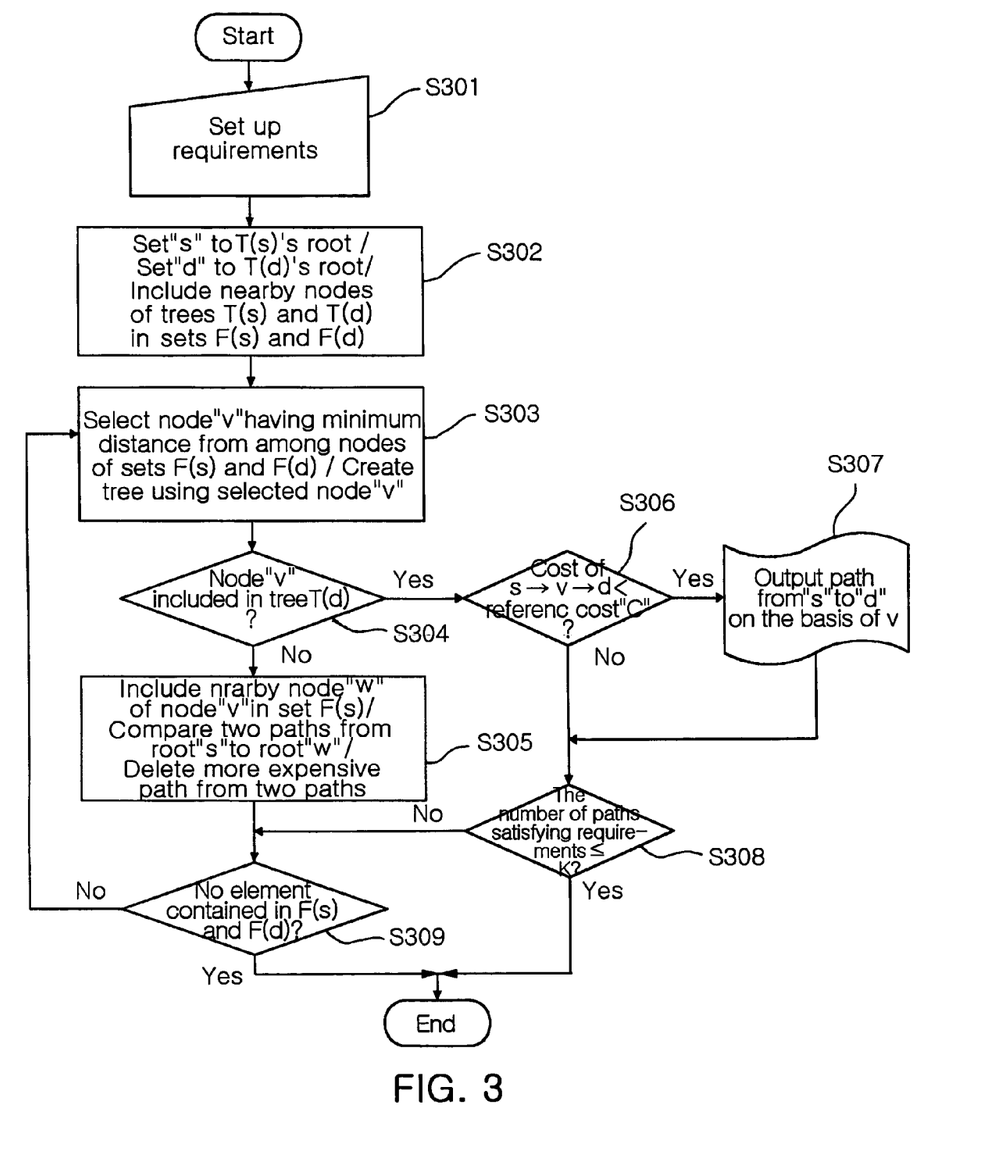
FIG. 3 is a flow chart illustrating a method for finding a QoS-guaranteeing multi-path in accordance with a preferred embodiment of the present invention.

FIG. 3 is a flow chart illustrating a method for finding a QoS-guaranteeing multi-path in accordance with a preferred embodiment of the present invention. Referring to FIG. 3, if a QoS service network is provided and a prescribed condition for finding the maximum K number of paths where a cost 13 consumed in the range from a start node s14 to a destination node d15 is below a prescribed value "C" is transmitted to the QoS service network at step S301, the start node s14 is set to a root of a tree T(s) and the destination node d15 is set to a root of a tree T(d), nearby nodes of the trees T(s) and T(d) are contained in the sets F(s) and F(d), respectively, at step S302. The closest node "v" to the root is selected from among elements of the sets F(s) and F(d), and a tree (i.e., a tree of either T(s) or T(d)) of a corresponding root is configured at step S303. In this case, it is assumed that the node "v" is contained in the T(s). Subsequently, it is determined whether the node "v" is previously contained in the other tree T(d) at step S304. If there is no node "v" in the tree T(d) at step S304, a nearby node "w" of the node "v" is contained in the set F(s). If the node "v" is previously contained in the set F(s), two paths ranging from the root "s" to the node "w" are compared with each other, and one link having a cost higher than that of the other link is removed at step S305. In order to continuously create such a tree, it is determined at step S309 whether nearby nodes (i.e., elements of the sets F(s) and F(d)) of a tree node exist. If there is no nearby node of the tree at step S309, a program is terminated. Otherwise, if a nearby node of the tree is found at step S309, a program returns to step S303.

However, if the node "v" is contained in the other tree T(d) at step S304, it is determined that the node "v" is contained in both trees T(s) and T(d), such that paths to both roots are determined. Therefore, a path from the root "s" to the node "v" and the other path from the node "v" to the root "d" are created, such that one path is determined. In this case, a cost consumed in the path from the root "s" to the node "d" on the basis of the node "v" is compared with a prescribed cost "C" at step S306. If the consumed cost of the path is lower than the prescribed cost "C" and the path is different from previously-found paths, the path ranging from the node "s" to the node "d" on the basis of the node "v" is determined, the number of paths is increased by one at step S307, and then a program goes to step S308. Otherwise, if the consumed cost of the path is higher than the prescribed cost "C", a program directly goes to step S308 without performing step S307.

The number of determined paths (i.e., calculated paths) is compared with a prescribed number "K" at step S308. If it is determined that calculations associated with K paths are previously completed, a program is terminated. In this case, it is determined that K paths are fully found, such that K candidate paths satisfying a requested QoS can be used. If the number of calculated paths is less than the prescribed number "K" at step S308, it is determined at step S308 whether nearby nodes (i.e., elements of sets F(s) and F(d)) of a tree node are found to continuously create trees. If there is no nearby node of the tree, a program is terminated. In this case, K paths satisfying a prescribed requirement are not found.

In the meantime, if the sets F(s) and F(d) contain their elements, a program returns to step S303 for selecting the closest node to a root in order to continuously create a tree, such that the program repeats the processing from step S303.

In this case, the aforementioned preferred embodiment relates to the case where the node "v" is contained in the tree T(s) at step S303, but paths can be found and determined according to the aforementioned process even though the node "v" is contained in the other tree T(d).

Figure 4:
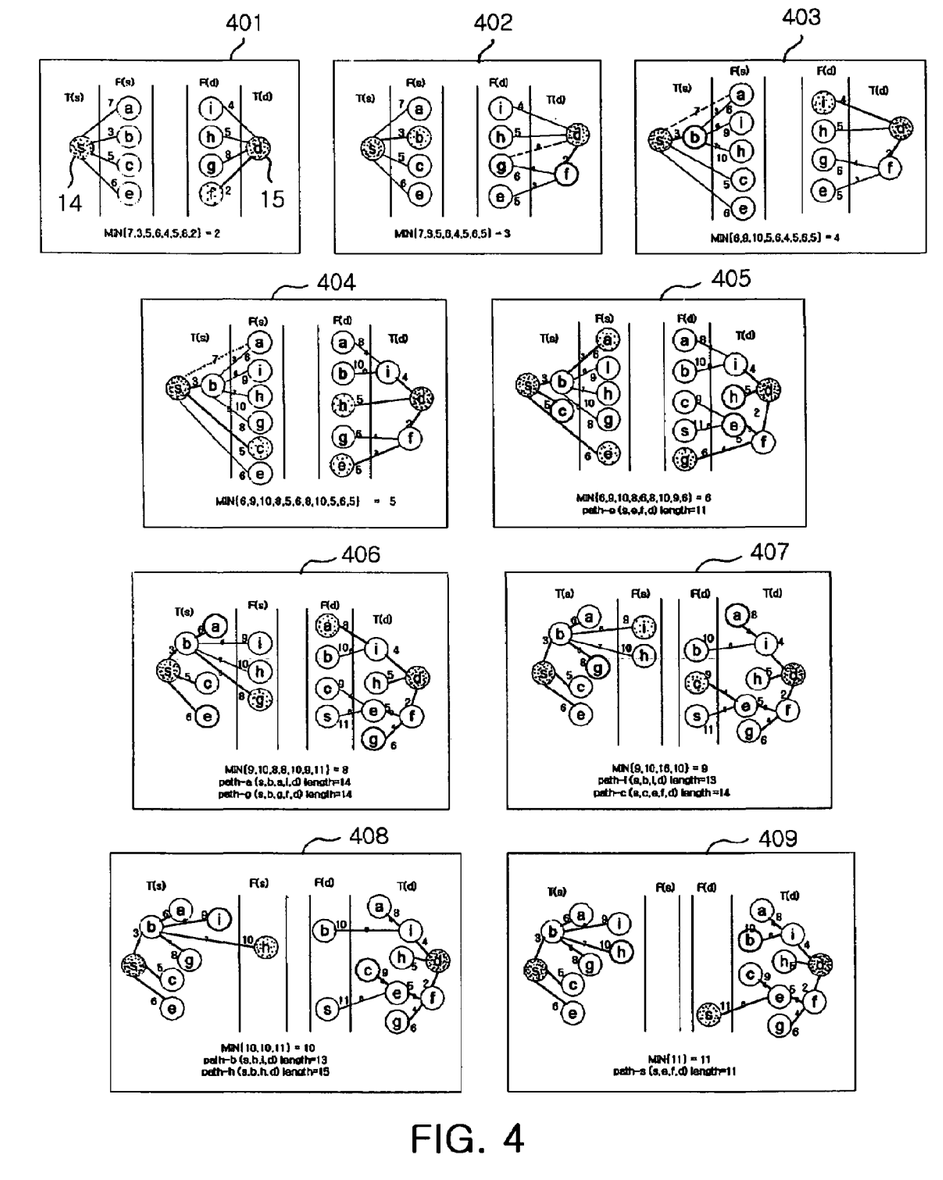
FIG. 4 is a view illustrating examples of a method for finding a QoS-guaranteeing multi-path in accordance with a preferred embodiment of the present invention.

FIG. 4 is a view illustrating examples of a method for finding a QoS-guaranteeing multi-path in accordance with a preferred embodiment of the present invention. Referring to FIG. 4, an input communication network graph is given as shown in FIG. 1. In more detail, FIG. 4 shows a procedure for finding a path having a cost less than a requested cost on the condition that a user desires to find a path satisfying a cost consumed in the range from a start node s14 to a destination node d15. A term "distance" will hereinafter be considered to have the same meaning as another term "cost". FIG. 4 shows the principle of determining a QoS-guaranteeing multi-path using a communication network graph shown in FIG. 1.

Referring to step 401 of FIG. 4, the start node "s" is contained in the tree T(s), and is adapted as a root of the tree T(s). T the destination node "d" is contained in the tree T(d), and is adapted as a root of the tree T(d). Nearby nodes "a", "b", "c", and "e" of the start node "s" are adapted as elements of a set F(s). Nearby nodes "i", "h", "g", and "f" of the destination node "d" are adapted as elements of a set F(d). Elements of the sets F(s) and F(d) have the shortest distance to roots "s" and "d". As shown in step 401, the shortest paths from elements "a", "b", "c", and "e" of the set F(s) to the root "s" are set to 7, 3, 5, and 6, respectively. The shortest paths from elements "i", "h", "g", and "f" of the set F(d) are set to 4, 5, 8, and 2, respectively. Then, the closest nodes to roots "s" and "d" are selected from among the above shortest distances using a prescribed condition MIN{7,3,5,6,7,5,8,2}=2. In this case, the closest nodes to the roots "s" and "d" are set to a node "f" having a distance of 2. Of course, the number of nodes close to the roots "s" and "d" may be set to at least 2.

Referring to step 402, the node "s" is contained in the tree T(d) for adapting the destination node "d" as a root, nearby nodes "e" and "g" of the node "f" are contained in the set F(d). Because the node "g" is previously contained in the set F(d), a first distance of the path "d→g" is compared with a second distance of the path "d→f→g", such that only a shorter one of the first and second distances remains. That is, because the first distance of the path "d→g" is set to 8 and the second distance of the path "d→f→g" is set to 6, the path "d→g" is deleted. In the same method as step 401, step 402 finds the shortest one from among nodes (i.e., elements of the sets F(s) and F(d)) close to individual roots using a prescribed condition MIN{7,3,5,6,4,5,6,5}=3. In this case, the node "b" having a distance of 3 is selected.

Referring to step 403, the node "b" is adapted as a node of the tree T(s), and the tree T(s) for adapting the start node "s" as a root is created. Nodes "a" and "i" close to the node "b" are contained in the set F(s). In this case, because the node "a" is previously contained in the set F(s), a first distance of the path "s→a" is compared with a second distance of the path "s→b→a", such that only a shorter one of the first and second distances remains. That is, because the first distance of the path "s→a" is set to 7 and the second distance of the path "s→b→a" is set to 6, the path "s→a" is deleted. Thereafter, step 403 finds the shortest one from among nodes (i.e., elements of the sets F(s) and F(d)) close to individual roots from among elements of the sets F(s) and F(d) using a prescribed condition MIN{6,9,10,5,6,4,5,6, 5}=4. In this case, the node "i" having a distance of 4 is selected because the node "i" has the shortest distance.

Referring to step 404, the node "i" is adapted as a node (i.e., an element) of the tree T(d), and the tree T(d) for adapting the destination node "d" as a root is created. Nodes "a" and "b" close to the node "i" are contained in the set F(d). Step 404 finds the shortest one from among nodes (i.e., elements of the sets F(s) and F(d)) close to individual roots from among elements of the sets F(s) and F(d) using a prescribed condition MIN{6,9,10,8,5,6,8,10,5,6,5}=5. In this case, the nodes "c", "h" and "e" each having a distance of 5 are selected.

According to the aforementioned method, step 405 selects nodes "a", "e", and "g" each having a distance of 6. Because, the node "e" is previously contained in the other tree T(d), a calculation process associated with the path-e is performed on the basis of the node "e". The path "e" is the path "s→e→f→d", and has a prescribed cost of 11. This cost 11 of the path "e" is compared with a requested cost "c" to determine whether the cost 11 satisfies a prescribed condition. If the cost 11 satisfies the prescribed condition, the number of paths is increased by one. If the number of paths is less than a predetermined number "K", a program goes to the next step 406. Otherwise, if the number of paths is above the predetermined number "K", a program is terminated.

Step 406 selects nodes "a" and "g" each having a distance of 8. Because the node "a" is previously contained in the tree T(s) and the node "g" is previously contained in the tree T(d), a calculation process associated with the paths "a" and "g" is performed on the basis of the nodes "a" and "e". In this case, the path "a" is a path "s→b→a→i→d", and has a cost of 14. The path "g" is a path "s→b→g→f→d", and has a cost of 14. The cost 14 of the paths "a" and "g" is compared with a requested cost "c". Step 406 compares the number of paths with a prescribed number "K" to determine whether a program continues to run.

Step 407 selects nodes "i" and "c" each having a distance of 9 using the aforementioned method. Because the node "i" is previously contained in the tree T(d) and the node "c" is previously contained in the tree T(s), a path calculation process is performed on the basis of the nodes "i" and "c". In this case, the path "i" is a path "s→b→i→d→d", and has a cost of 13. The path "c" is a path "s→c→e→f→d", and has a cost of 14. The costs 13 and 14 of the paths "i" and "c" are compared with a requested cost "c". Step 407 compares the number of the paths with a prescribed number "K" to determine whether a program continues to run.

Subsequently, step 408 selects nodes "h" and "b" each having a distance of 10 using the aforementioned method. Because the node "h" is previously contained in the tree T(d) and the node "b" is previously contained in the tree T(s), a path calculation process is performed on the basis of the nodes "h" and "b". In this case, the path "h" is a path "s→b→h→d", and has a cost of 15. The path "b" is a path "s→b→i→d", and has a cost of 13. The path "b" is equal to the path "i". In this way, if one path is equal to the other path, a method for preventing the number of paths from being increased should be adapted using a comparison process between paths, and will hereinafter be described with reference to FIG. 5. The costs 15 and 13 of the paths "h" and "b" are compared with a requested cost "c". Step 408 compares the number of the paths with a prescribed number "K" to determine whether a program continues to run.

In this way, step 409 selects the start node "s" having a distance of 10. The path of step 409 is a path "s→e→f→d", and has a prescribed cost of 11.

Using the aforementioned steps 401 to 409, K paths satisfying the requested costs consumed in the range from the start node "a" to the destination node "d" are determined.

Figure 5:
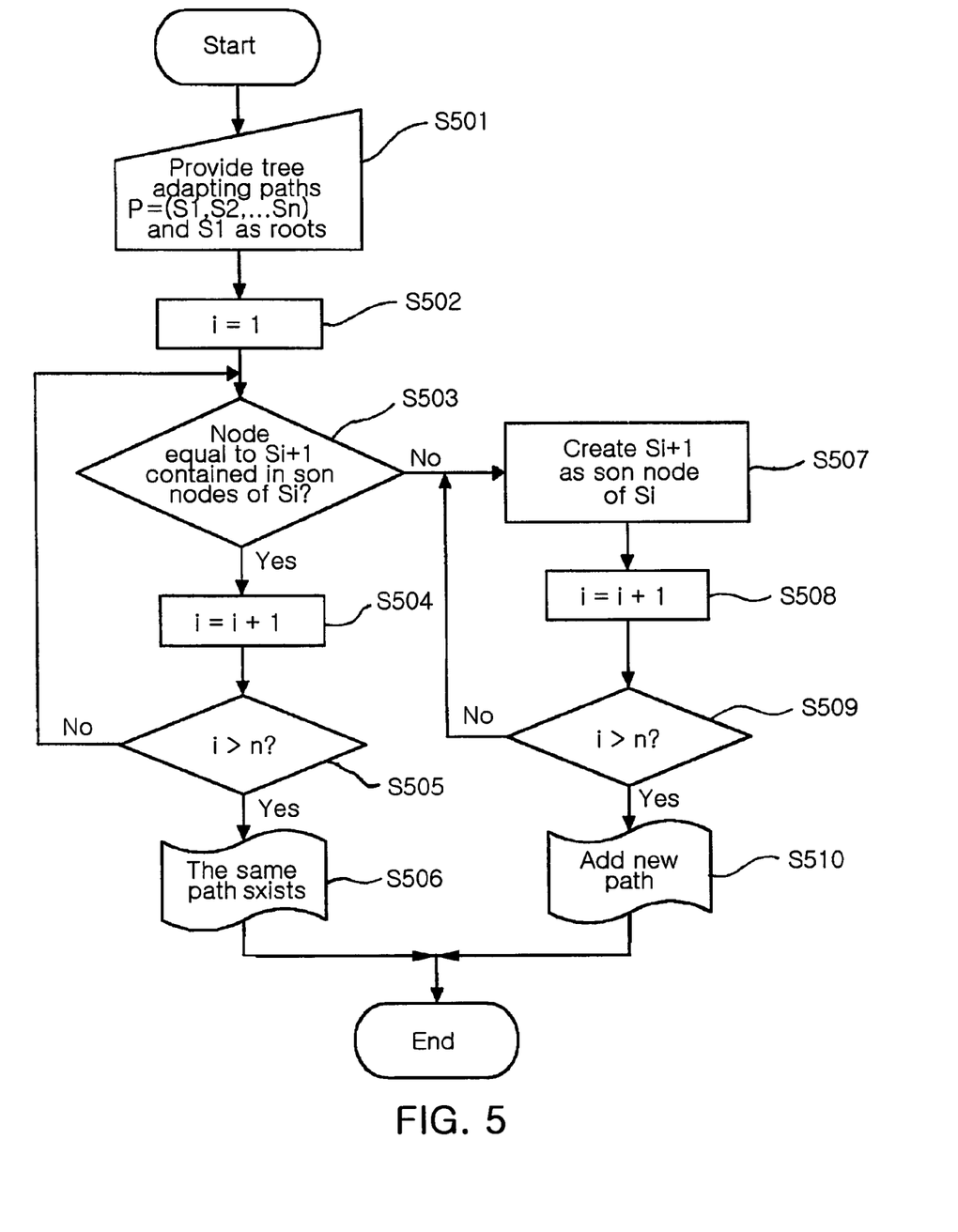
FIG. 5 is a flow chart illustrating a method for processing a redundant path when the redundant path is found in a path calculation process in accordance with a preferred embodiment of the present invention.

FIG. 5 is a flow chart illustrating a method for processing a redundant path when the redundant path is found in a path calculation process in accordance with a preferred embodiment of the present invention. A method for finding a QoS-guaranteeing multi-path continuously performs a calculation process associated with paths. However, it should be noted that the paths may be overlapped with each other in the calculation process. Therefore, in order to find and determine K number of different paths, the present invention must determine whether a path equal to another path is found in a plurality of paths determined by such calculation. This operation will hereinafter be described with reference to FIG. 5.

Referring to FIG. 5, if a tree for adapting one path denoted by "P=(S1, S2, . . . , Si, . . . , Sn)" as a root is provided at step S501, a comparison process between the tree and strings on paths begins at the root Si (first, i=1) at step S502. Firstly, it is determined at step 503 whether there is a redundant node equal to another node "Si+1" in a plurality of child nodes of the root Si. If it is determined at step 503 whether a redundant node equal to another node "Si+1" is found in the child nodes of the root Si, the number of variables "i" is increased by one, and step S503 is repeatedly applied to this increased "i" at steps 504 and S505. In this way, the above steps S503 to S505 are repeatedly applied until reaching the last root Sn. If the redundant node equal to another node is found in the range from Si to Sn, this fact that paths identical to each other previously exist in the tree is indicated at step S506.

However, if it is determined at step 503 that there is no node equal to another node "Si+1" in a plurality of child nodes of the root Si, a new node "Si+1" is created as a child node of the root Si to create a new branch at step S507. Then, the number of variables "i" is increased by one, step S507 is repeated until the root Sn is created at steps S508 and S509. As a result, the fact that a new path is added to the tree is indicated at step S510.

Figure 6:
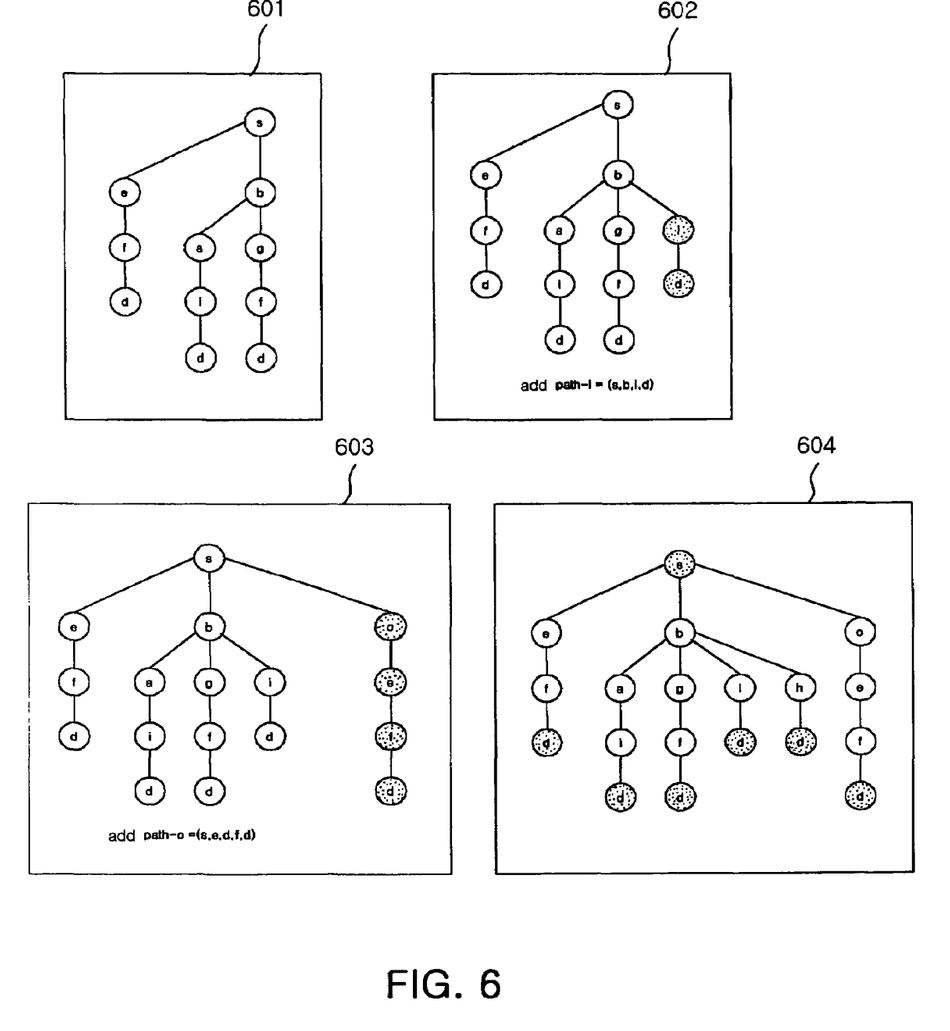
FIG. 6 is a view illustrating examples of a method for processing a redundant path when the redundant path is found in a path calculation process in accordance with a preferred embodiment of the present invention.

FIG. 6 is a view illustrating examples of a method for processing a redundant path when the redundant path is found in a path calculation process in accordance with a preferred embodiment of the present invention. In more detail, FIG. 6 shows examples of the above method for processing the redundant path. For example, in the case of a communication network graph shown in FIG. 1, if a calculation process associated with paths is performed in the order of "path-e=(s,e,f,d)", "path-a=(s,b,a,i,d)", "path-g=(s, b,g,f,d)", "path-i=(s,b,i,d)", "path-c=(s,c,e,f,d)", "path-b=(s, b,i,d)", "path-h=(s,b,h,d), and "path-s=(s,e,f,d)", the path-e is the same as the path-s and the path-i is the same as the path-b. Using the aforementioned calculation process associated with the paths, the paths are configured in the form of a tree adapting the start node "s" as a root. If there is no node equal to another node located while finding trees associated with output paths in the range from a root node to a leaf node, the addition of a node should be performed in such a way that a user can create a tree and at the same time can find the same path as another path in the tree.

Referring to FIG. 6, if the path-e, the path-a, and the path-g are added at step 601 and the path-i is then added, a new branch (b,i,d) is additionally created at step 602. Provided that the path-c is added, a new branch (s,c,e,f,d) is additionally created at step 603. However, provided that the path-b is added, a new node is not created in the tree. Therefore, the user can recognize that the same node as a currently calculated node previously exists in the tree. If all paths are added, the tree has leaf nodes equal to the number of paths at step 604. As can be seen from this example, it can be recognized that 6 different paths exist in the tree.

Figure 7:
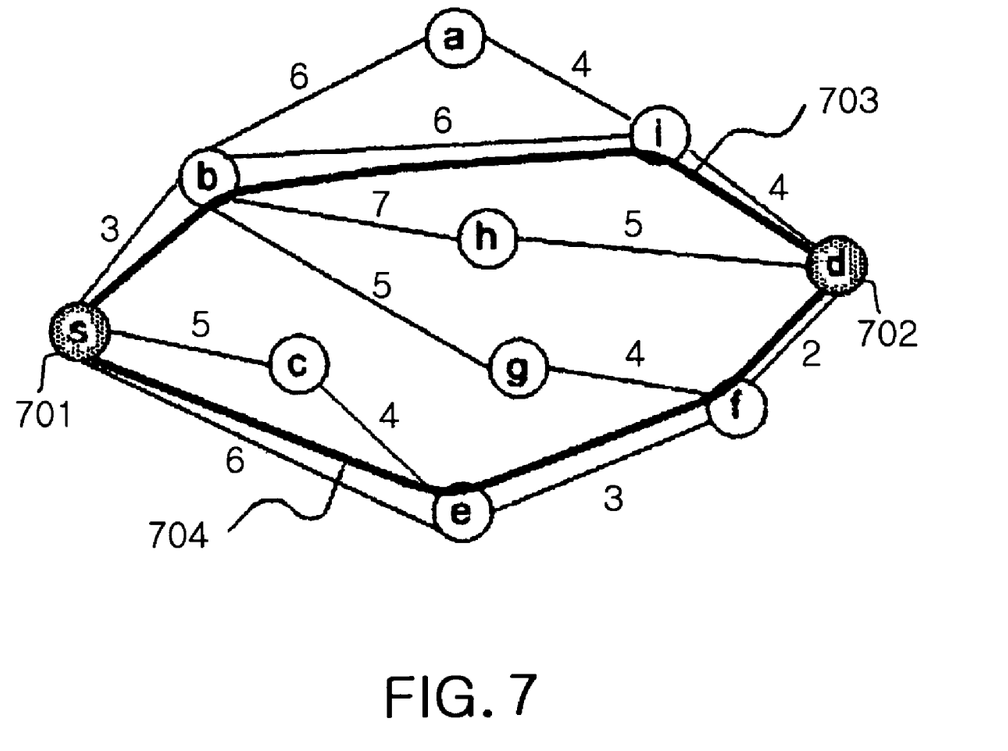
FIG. 7 is a view illustrating an example of disjoint paths created after finding multiple paths in accordance with a preferred embodiment of the present invention.

FIG. 7 is a view illustrating an example of disjoint paths created after finding multiple paths in accordance with a preferred embodiment of the present invention. Referring to FIG. 7, if two paths 703 and 704 contained in the found multiple paths have different nodes "b" and "e" close to start node "s", and have different nodes "i" and "f" close to the destination node "d", it can be recognized that the above paths 703 and 704 are disjointed from each other. For example, the path "s→b→a→i→d" 703 sets a nearby node of the start node "s" to a node "b" and sets a nearby node of the node "d" to a node "i", and the path "s→e→f→d" 704 sets a nearby node of the start node "s" to a node "e" and sets a nearby node of the node "d" to a node "f", such that it can be recognized that the path "s→b→a→i→d" 703 is disjointed from the path "s→e→f→d" 704. Preferably, such disjoint paths may be adapted as a working path and a back-up path.

Figure 8:
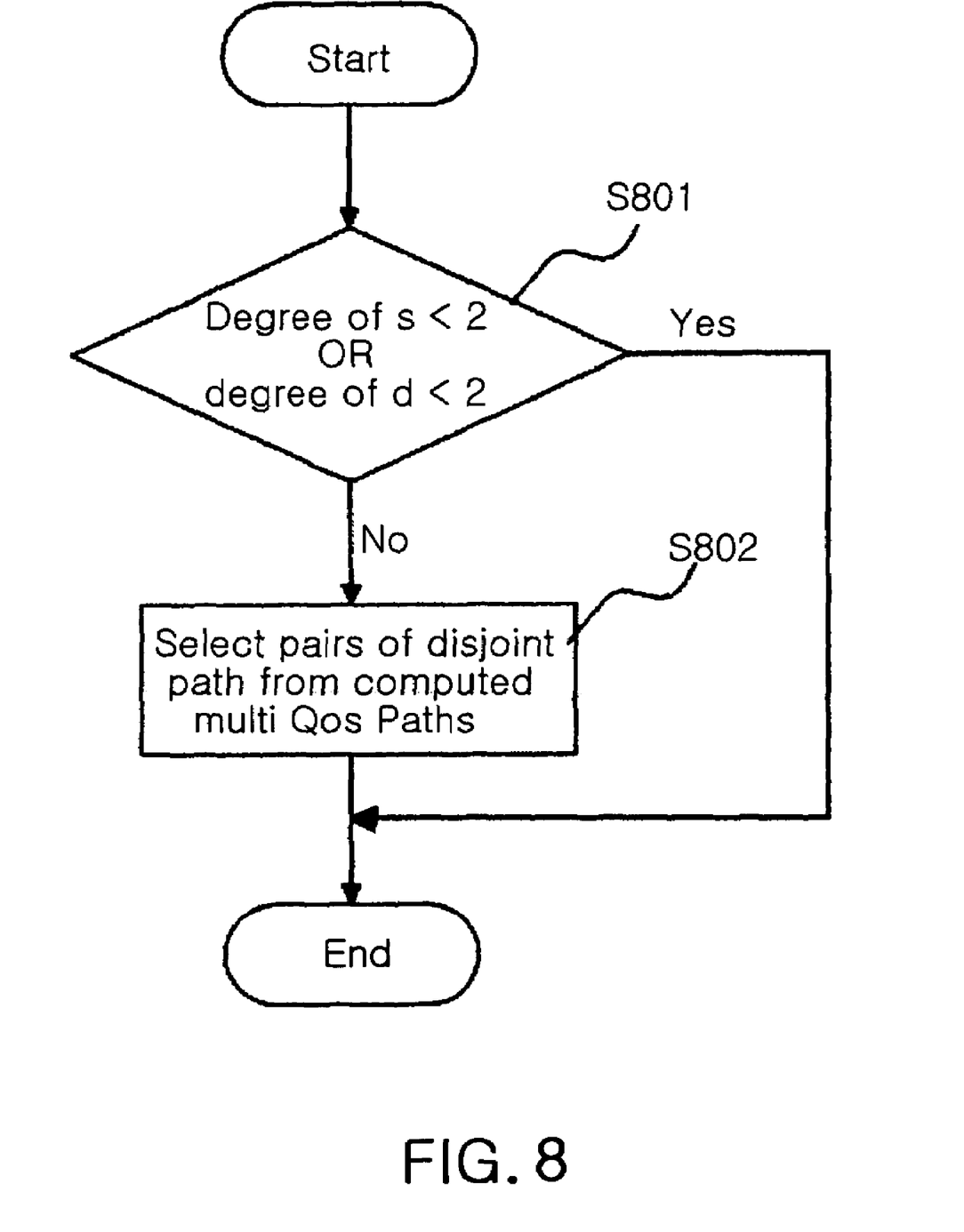
FIG. 8 is a flow chart illustrating a method for providing two disjoint paths using the multiple paths in accordance with a preferred embodiment of the present invention.

FIG. 8 is a flow chart illustrating a method for providing two disjoint paths using the multiple paths in accordance with a preferred embodiment of the present invention. Referring to FIG. 8, it is determined at step S801 whether a degree of the start node "s" or the destination node "d" is less than a predetermined value of 2. In this case, the degree of the node "v" indicates the number of edges of the node "v", and is denoted by a reference character "deg(v)". If it is determined at step S801 that the degree of the start node "s" or the destination node "s" is less than 2, it is impossible to find two disjoint paths, such that a program is terminated. In this case, there is needed another supplementary method. In more detail, if the degree of the start node "s" or the destination node "s" is less than 2, this condition means that there is only one nearby node directly connected to the start node "s" and the destination node "d". In more detail, the above condition means that a nearby node of the start node "s" is equal to that of the destination node "d", resulting in no disjoint path. In conclusion, there is no way to find a disjoint path on the condition that the degree of the start node "s" or the destination node 's" is less than 2, such that a program is terminated.

In the meantime, if it is determined at step S801 that the degree of the start node "s" or the destination node "s" is higher than the predetermined value of 2, more than two disjoint paths are found in the graph shown in FIG. 7 at step S802. Preferably, a pair of disjoint paths is found in the graph of FIG. 7.

The above method for finding disjoint paths can be implemented with a variety of application methods. For example, a representative method for finding such disjoint paths is a randomization method. The randomization method selects arbitrary two paths from among the found multiple paths, determines whether a nearby node of the start node is different from that of the destination node to recognize disjoint paths. In this case, if the randomization method fails to recognize such disjoint paths, it selects two other paths to reattempt the above method for finding disjoint paths. The randomization method is very effective to the case where the start node or the destination node has a high degree. A method for adapting a tree configuration shown in FIG. 6 may be adapted as another example. This method selects a first path traveling from a root "s" to a leaf node, selects a second path traveling from the root "s" to the destination node on the basis of a child node, and determines whether nearby nodes of the destination node "d" are equal to each other. In this case, if the nearby nodes are equal to each other, the method performs a backtracking process to select another path.

Besides the aforementioned methods, there may arise a variety of methods for finding two disjoint paths in the found multiple paths.

As apparent from the above description, the present invention can find candidate paths within an optimal time. If it is determined that the found paths are ineffective paths or a path setup failure occurs, a calculation process associated with a corresponding path is not required any longer, and another path other than the corresponding path is selected, resulting in reduction of the number of calculations. Further, the present invention selects one path from among the calculated multiple paths, resulting in reduction of a failure rate in a path setup process.

The present invention equally distributes the calculated multiple paths to data loads and thus network resources can be equally distributed across the overall network, resulting in increased efficiency of network use.

The present invention sets up disjoint paths for a working path and a back-up path in a network system for adapting a path protection mechanism and a path restoration mechanism to support a reliable QoS service, resulting in a reliable network service having high reliability associated with a single node failure and a single link failure.

Further, the present invention can be adapted to perform QoS routing and path restoration even in a variety of networks such as an MPLS, GMPLS, and MPλS, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing a process associated with a QoS-guaranteeing multi-path in a path-based communication network having a plurality of nodes, comprising the steps of:
    a) determining a start node, a destination node and a requirement condition associated with a reference cost consumed in a range from the start node to the destination node;
    b) creating a first tree adapting the start node as its root and a second tree adapting the destination node as its root, including nodes close to the start node in a first node group, and including nodes close to the destination node in a second node group;
    c) selecting a node having a minimum cost associated with the roots from among a plurality of nodes contained in the first and second node groups, and including the selected node having the minimum cost in a tree of a corresponding root;
    d) if the selected node included in the tree at the step (c) is also included in the first and second trees, and a cost consumed in the range from the start node to the destination node on the basis of the selected node is less than the reference cost, providing a corresponding path associated with the cost;

e) including a nearby node of the selected node in a node group having the selected node when the selected node included in the tree at the step (c) is also included in either one of the first and second trees, comparing two paths ranging from a root to the nearby node when the nearby node is previously included in the node group, and deleting a link of a cheaper one of the two paths; and f) determining whether there is a node contained in the first node group and the second node group, repeatedly performing a process from the step (c) when the node is found in the first and second node groups, or terminating the process from the step (c) when no node is found in the first and second node groups.

2. The method according to claim 1, further comprising the steps of:

g) determining a maximum number of paths satisfying the determined requirement condition; and h) if a number of output paths is higher than the maximum number of paths, terminating a path setup program.

3. The method according to claim 1, wherein the step (d) for outputting a path includes the steps of:

d1) determining whether the same path as a currently calculated path is previously outputted; and d2) if the same path as the current path is not outputted, outputting a corresponding path equal to the current path.

4. The method according to claim 3, wherein the step (d1) includes the step of:

if it is determined that a node equal to another node "Si+1" is found in child nodes of output paths (S1, S2, . . . , Si, . . . , Sn) from a start root S1 to a root Si, determining that the same path as a path associated with the node "Si+1" has been previously outputted.

5. The method according to claim 3, wherein the step (d2) includes the steps of:

if it is determined that a node equal to another node "Si+1" is not found in son nodes of output paths (S1, S2, . . . , Si, . . . , Sn) from a start root S1 to a root Si, creating the node "Si+1" as a child node of the node Si and outputting the path associated with the node "Si+1".

6. The method as set forth in claim 1, further comprising the steps of:

i) selecting a first path from the start node to the destination node from among a plurality of paths outputted at the step (d); and j) selecting at least one second path disjointed from an intermediate node existing in the first path from among multiple paths ranging from the start node to the destination node, and providing a disjoint path.

7. The method as set forth in claim 6, wherein the step (h) includes the steps of:

h1) determining whether the start node or the destination node has a degree of less than 2; and h2) if the start node or the destination node has a degree of less than 2, determining that there is no disjoint path.

8. The method as set forth in claim 1, further comprising the steps of:

k) selecting two paths from among a plurality of paths outputted at the step (d); and l) determining whether the selected two paths are disjointed from each other, and providing a disjoint path according the determination result.

9. The method as set forth in claim 8, wherein the step (l) includes the step of:

determining whether a nearby node of the start node of a first node contained in the two paths is equal to that of the destination node of a second node contained in the two paths, and determining a disjoint path according to the determination result.

10. A computer-readable recording medium for storing a program executed by a computer, said program comprising the steps of:

determining a start node, a destination node and a requirement condition associated with a reference cost consumed in a range from the start node to the destination node;

b) creating a first tree adapting the start node as its root and a second tree adapting the destination node as its root, including nodes close to the start node in a first node group, and including nodes close to the destination node in a second node group;

c) selecting a node having a minimum cost associated with the roots from among a plurality of nodes contained in the first and second node groups, and including the selected node having the minimum cost in a tree of a corresponding root;

d) if the selected node included in the tree at the step (c) is also included in the first and second trees, and a cost consumed in the range from the start node to the destination node on the basis of the selected node is less than the reference cost, outputting a corresponding path associated with the cost;

e) including a nearby node of the selected node in a node group having the selected node when the selected node included in the tree at the step (c) is also included in either one of the first and second trees, comparing two paths ranging from a root to the nearby node when the nearby node is previously included in the node group, and deleting a link of a cheaper one of the two paths; and f) determining whether there is a node contained in the first node group and the second node group, repeatedly performing a process from the step (c) when the node is found in the first and second node groups, or terminating the process from the step (c) when no node is found in the first and second node groups.

* * * * *